(12) United States Patent
Zink et al.

(10) Patent No.: US 7,887,128 B2
(45) Date of Patent: Feb. 15, 2011

(54) CHILD RESTRAINT INCLUDING ADJUSTABLE BASE

(75) Inventors: Paul T. Zink, Indianapolis, IN (US); Andrew B. Mendenhall, Mooresville, IN (US); Todd C. Midkiff, Noblesville, IN (US)

(73) Assignee: Cosco Management, Inc., Wilmington, DE (US)

( * ) Notice: Subject to any disclaimer, the term of this patent is extended or adjusted under 35 U.S.C. 154(b) by 49 days.

(21) Appl. No.: 12/470,106

(22) Filed: May 21, 2009

(65) Prior Publication Data

US 2009/0295207 A1    Dec. 3, 2009

Related U.S. Application Data

(60) Provisional application No. 61/055,085, filed on May 21, 2008.

(51) Int. Cl.
    A47D 1/10    (2006.01)
(52) U.S. Cl. .................... 297/256.13; 297/250.1
(58) Field of Classification Search ............ 297/256.13, 297/250.1
    See application file for complete search history.

(56) References Cited

U.S. PATENT DOCUMENTS

| 4,632,456 | A | 12/1986 | Kassai |
| 5,286,085 | A | 2/1994 | Minami |
| 5,651,584 | A | 7/1997 | Chenot et al. |
| 5,810,436 | A | 9/1998 | Surot |
| 5,810,445 | A * | 9/1998 | Surot .................. 297/250.1 X |
| 5,836,650 | A | 11/1998 | Warner, Jr. et al. |
| 6,042,182 | A | 3/2000 | Geis et al. |
| 6,139,101 | A | 10/2000 | Berringer et al. |
| 6,170,911 | B1 | 1/2001 | Kassai et al. |
| 6,299,249 | B1 | 10/2001 | Mori |
| 6,318,799 | B1 | 11/2001 | Greger et al. |
| 6,347,832 | B2 | 2/2002 | Mori |
| 6,454,350 | B1 | 9/2002 | Celestina-Krevh et al. |
| 6,554,358 | B2 | 4/2003 | Kain |
| 6,705,675 | B1 | 3/2004 | Eastman et al. |
| 6,705,676 | B1 | 3/2004 | Berringer et al. |
| 6,779,842 | B2 | 8/2004 | McNeff |
| 6,834,915 | B2 | 12/2004 | Sedlack |
| 6,857,700 | B2 * | 2/2005 | Eastman et al. ..... 297/256.13 X |
| 6,979,057 | B2 | 12/2005 | Sedlack |
| 7,055,903 | B2 | 6/2006 | Balensiefer et al. |
| 7,059,676 | B2 | 6/2006 | McNeff |
| 7,059,677 | B2 | 6/2006 | Balensiefer et al. |
| 7,163,265 | B2 | 1/2007 | Adachi |
| 7,207,628 | B2 | 4/2007 | Eros |
| 7,237,840 | B2 | 7/2007 | Furui |
| 7,325,871 | B2 | 2/2008 | Gangadharan et al. |
| 7,338,122 | B2 | 3/2008 | Hei et al. |
| 2005/0127722 | A1 | 6/2005 | Longenecker et al. |
| 2005/0253431 | A1 | 11/2005 | Hei et al. |
| 2006/0181124 | A1 | 8/2006 | Kish |
| 2007/0157752 | A1 | 7/2007 | Knopfle et al. |

* cited by examiner

*Primary Examiner*—Rodney B White
(74) *Attorney, Agent, or Firm*—Barnes & Thornburg LLP

(57) ABSTRACT

A child restraint includes an infant carrier and a base for supporting the infant carrier. The base is configure to be tethered to a passenger seat in a vehicle. The base can be adjusted to tilt the infant carrier relative to the passenger seat.

14 Claims, 6 Drawing Sheets

CHILD RESTRAINT INCLUDING ADJUSTABLE BASE

This application claims priority under 35 U.S.C. §119(e) to U.S. Provisional Application Ser. No. 61/055,085, filed May 21, 2008, which is expressly incorporated by reference herein.

BACKGROUND

The present disclosure relates in general to child restraints and, more particularly, to a base configured to tilt and adjust the tilt of an infant carrier included in a child restraint.

SUMMARY

According to the present disclosure, a child restraint includes an infant carrier and a base for installation on a vehicle seat having a seat belt. In illustrative embodiments, the base includes a cradle support, a carrier cradle movable relative to the cradle support, and an angle-adjustment mechanism configured to enable adjustment of the angle of the juvenile vehicle seat relative to the cradle support to allow a caregiver to establish a desired position of the juvenile vehicle seat relative to the underlying vehicle seat.

In illustrative embodiments, the angle-adjustment mechanism is placed and configured such that the angle of the infant carrier relative to the cradle support is adjustable both prior to and subsequent to installation of the base on a vehicle seat.

Additional features of the disclosure will become apparent to those skilled in the art upon consideration of the following detailed description of illustrated embodiments exemplifying the best mode of carrying out the disclosure as presently perceived.

BRIEF DESCRIPTION OF THE DRAWINGS

The detailed description particularly refers to the accompanying Figures in which.

DETAILED DESCRIPTION

Figure 1:
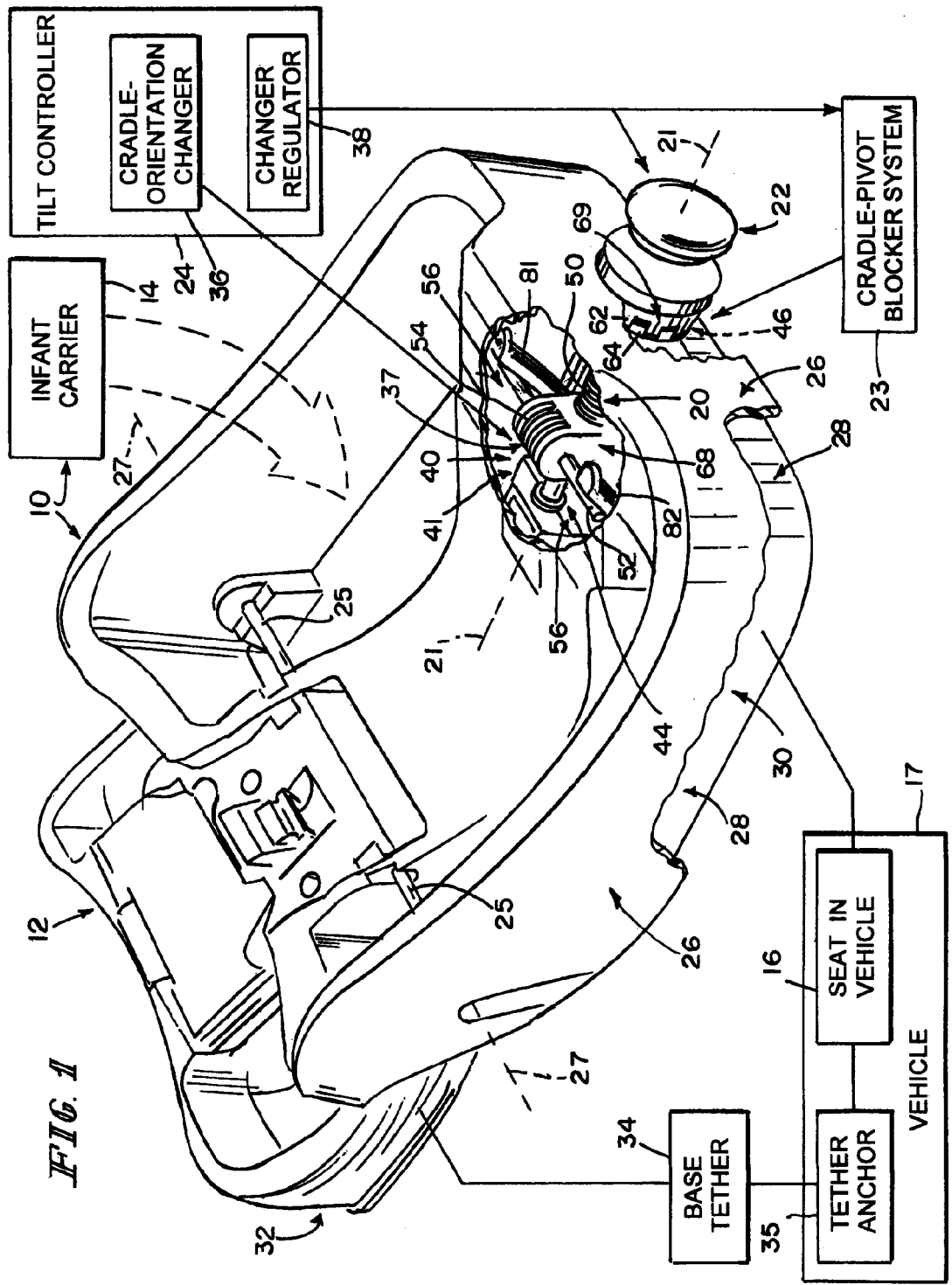
FIG. 1 is a perspective view of a child restraint including an adjustable base in accordance with the present disclosure in combination with a diagrammatic view of an infant carrier that can be mounted on the adjustable base and suggesting diagrammatically that the adjustable base can be tethered to a tether anchor included in a vehicle to hold the adjustable base in a tethered position on a vehicle seat included in the vehicle with portions of a tiltable carrier cradle of the adjustable base being broken away to show underlying portions of (1) a cradle support and (2) a tilt controller configured to provide means for changing the angle of inclination (i.e., tilt angle) of the tiltable carrier cradle relative to the cradle support as suggested in FIGS. 4-6.
Figure 3:
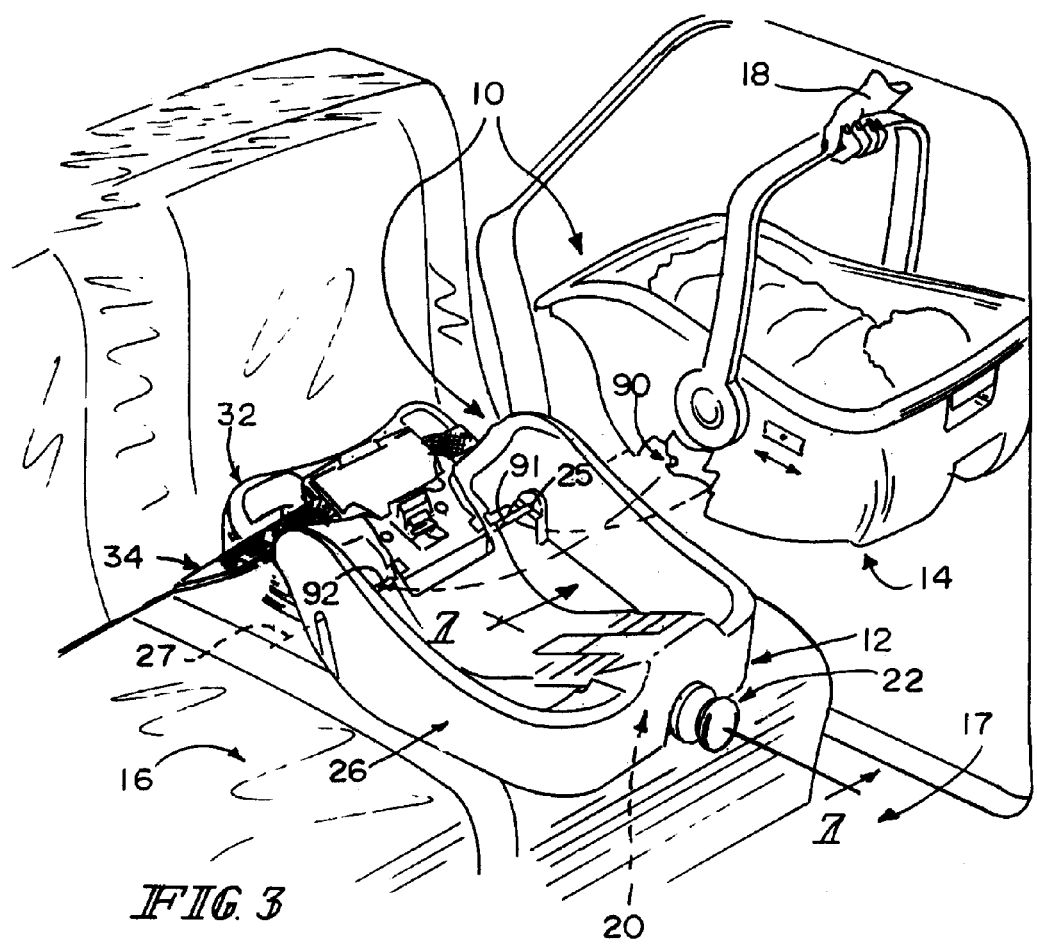
FIG. 3 is a perspective view of the adjustable base of FIGS. 1 and 2 tethered to an underlying vehicle seat and showing a caregiver passing an infant carrier through an opening into a vehicle passenger compartment and showing that the tiltable carrier cradle is retained in an untilted (nearly horizontal) position relative to the underlying cradle support and provided with two separate carrier-anchor rods that are adapted to mate with rod mounts included in the infant carrier gripped by the caregiver.

A child restraint 10 includes an adjustable base 12 shown in FIGS. 1 and 3 and a detachable infant carrier 14 shown diagrammatically in FIG. 1 and illustratively in FIG. 3. Adjustable base 12 is adapted to be held in place on a vehicle seat 16 and mate with infant carrier 14 as suggested in FIG. 3. Adjustable base 12 can be operated by a caregiver 18 as suggested in FIGS. 4-6 and FIGS. 7, 8, 10, and 11 to change the angle of inclination (i.e., tilt angle) of infant carrier 14 relative to vehicle seat 16 by turning a rotatable actuator 20 included in adjustable base 12 about an axis of rotation 21 using an actuator-driver knob 22 included in a tilt controller 24 and coupled to rotatable actuator 20. By turning rotatable actuator 20, a caregiver 18 can pivot a tiltable carrier cradle 26 mated with infant carrier 14 about a pivot axis 27 relative to an underlying cradle support 28 adapted to rest on vehicle seat 16 from a no-tilt (nearly horizontal) position shown in FIG. 4 to a low-tilt (i.e., gently sloping) position shown in FIG. 5 or to a high-tilt (i.e., steeply sloping) position shown in FIG. 6.

Figure 2:
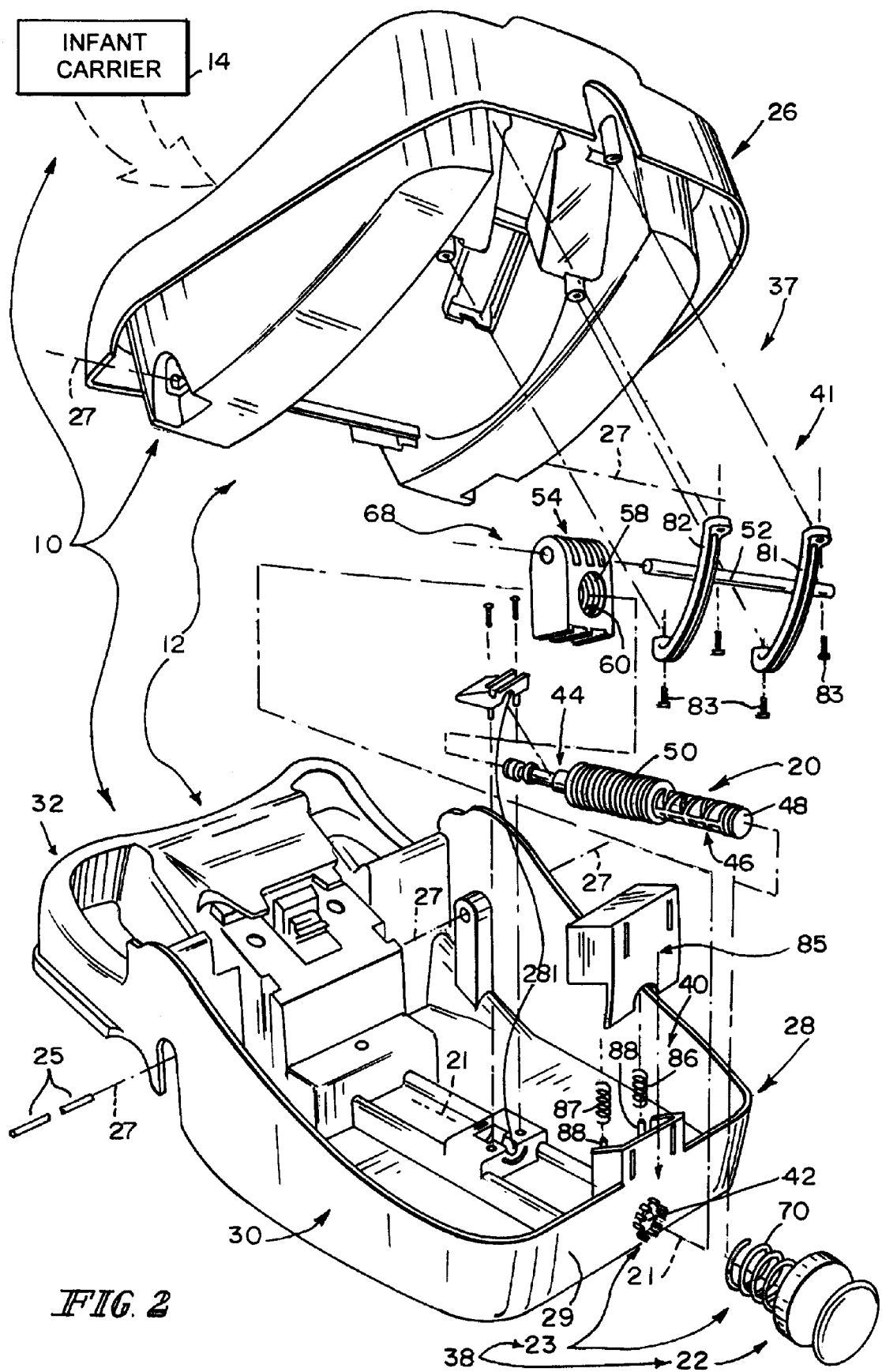
FIG. 2 is an exploded perspective assembly view of the adjustable base of FIG. 1 showing a diagrammatic representation of an infant carrier, the underside of a tiltable carrier cradle included in the adjustable base and configured to mate with an infant carrier in an illustrative manner shown in FIG. 3, and the top side of a cradle support included in the adjustable base and configured to set on a vehicle seat and lie under the tiltable carrier cradle, and further showing (at the lower left) an axle configured to mate with the tiltable carrier cradle and the cradle support to support the tiltable carrier cradle for pivotable (i.e., tilting) movement relative to the cradle support (as suggested in FIGS. 4-6) about a pivot axis (established by the axle) as well as other components that cooperate to provide a tilt controller that is configured to be operated by a caregiver to pivot the carrier cradle relative to the underlying cradle support about the pivot axis to change the angle of inclination (i.e., tilt angle) of the tiltable carrier cradle relative to the adjustable base and suggesting that the tilt controller includes a cradle-orientation changer comprising several components (including, for example, a rotatable actuator provided with a worm for use in a worm drive) located between the tiltable carrier cradle and the cradle support and a changer regulator comprising several other components (including, for example, an actuator-driver knob adapted to mate with a free end of the rotatable actuator) located in the lower right-hand portion of FIG. 2.

Adjustable base 12 includes a cradle support 28, a tiltable carrier cradle 26, a pivot axle 25, and a tilt controller 24 as suggested in FIGS. 1 and 2. Cradle support 28 is adapted to set on a passenger seat 16 in a vehicle 17. Tiltable carrier cradle 26 is mounted on cradle support 28 using pivot axle 25 for pivotable movement about pivot axis 27 relative to cradle support 28 to change the angular orientation of tiltable carrier cradle 26 relative to cradle support 28 a shown, for example, in FIGS. 3-6. Tilt controller 24 is configured to provide means operable by caregiver 18 for pivoting tiltable carrier cradle 26 about pivot axis 27 and retaining tiltable carrier cradle 26 (and a detachable infant carrier 14 mated to tiltable carrier cradle 26) in a horizontal or inclined position selected by caregiver 18 In an illustrative embodiment, tilt controller 24 includes rotatable actuator 20 and actuator-driver knob 22 coupled to rotatable actuator 20.

As shown, for example, in FIG. 2, cradle support 28 includes a forwardly extending base 30 and a rearwardly extending tether mount 32 coupled to base 30. Base 30 is configured to underlie tiltable carrier cradle 26 as suggested in FIGS. 1 and 2. Tether mount 32 is configured to mate with a base tether 34 shown diagrammatically in FIG. 1 and illustratively in FIG. 2. Base tether 34 is configured to mate with a tether anchor 35 associated with passenger seat 16 to hold cradle support 28 of adjustable base 12 in a tethered position on passenger seat 16 prior to, during, and after pivoting movement of tiltable carrier cradle 26 (and a detachable infant carrier 14 mated to tiltable carrier cradle 26) relative to cradle support 28.

As suggested diagrammatically in FIG. 1, tilt controller 24 includes a cradle-orientation changer 36 and a changer regulator 38. In an illustrative embodiment, as suggested in FIGS. 1 and 7, cradle-orientation changer 36 is located in a space 41 provided between tiltable carrier cradle 26 and the underlying cradle support 28 while changer regulator 38 is arranged to lie outside of space 41 in a position where it can be gripped easily by a consumer as suggested in FIGS. 2 and 4.

Cradle-orientation changer 36 includes rotatable actuator 20 in an illustrative embodiment, as suggested in FIGS. 2, 7, 10, and 11. Cradle-orientation changer 36 also includes a cradle elevator 37 that is coupled to rotatable actuator 20 and is configured to provide means for pivoting tiltable carrier cradle 26 up and down about pivot axis 27 in response to rotation of rotatable actuator 20 about axis of rotation 21 as a caregiver 18 turns actuator-driver knob 22 about axis of rotation 21 as suggested in FIGS. 4-6, 7, 10, and 11.

Change regulator 38 includes actuator-driver knob 22 and a cradle-pivot blocker system 23 coupled to cradle support 28 and actuator-driver knob 22 (as suggested in FIG. 1) and configured to provide means 69 for selectively blocking rotation of actuator-driver knob 22 and rotatable actuator 20 coupled to actuator-driver knob 22 about axis of rotation 21 so that tiltable carrier cradle 26 (and a detachable infant carrier 14 mated on tiltable carrier cradle 26) is retained in a selected stationary tilted or non-tilted position relative to the underlying cradle support 28 as suggested in FIGS. 1, 2, and 7-9.

Cradle support 28 is formed to include an interior region 40 and an actuator-receiver aperture 42 opening into interior region 40 as suggested in FIGS. 2 and 7-11. In an illustrative embodiment, cradle support 28 includes a front wall 29 located adjacent to actuator-driver knob 22 and formed to include actuator-receiver opening 42 as suggested in FIGS. 2 and 9.

Figure 7:
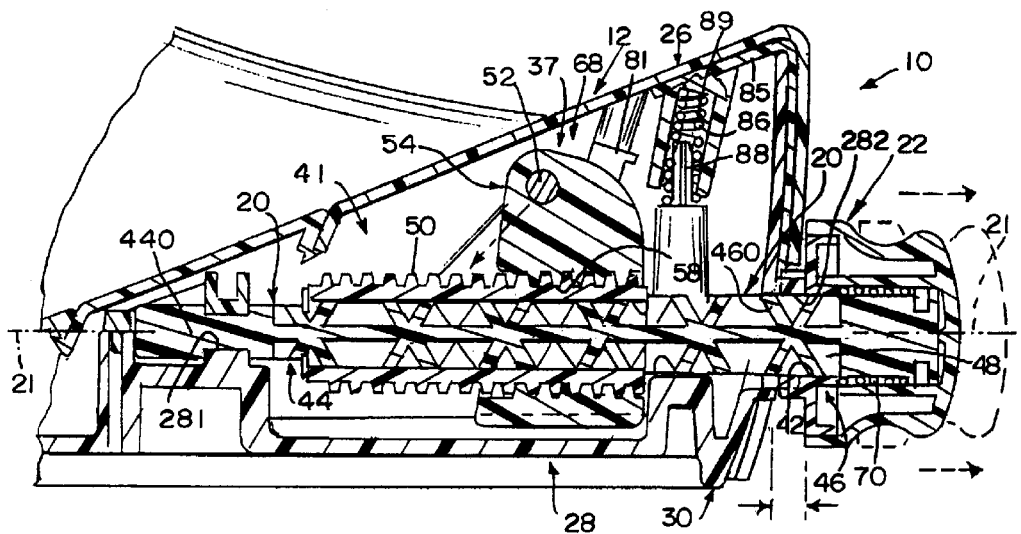
FIG. 7 is an enlarged sectional view of a portion of the adjustable base taken along line 7-7 of FIG. 3 showing the tiltable carrier cradle in a no-tilt (i.e., nearly horizontal) initial position relative to the underlying cradle support and showing that a cradle pivot-blocker system included in the adjustable base is enabled to block pivoting movement of the tiltable carrier cradle relative to the underlying cradle support.
Figure 10:
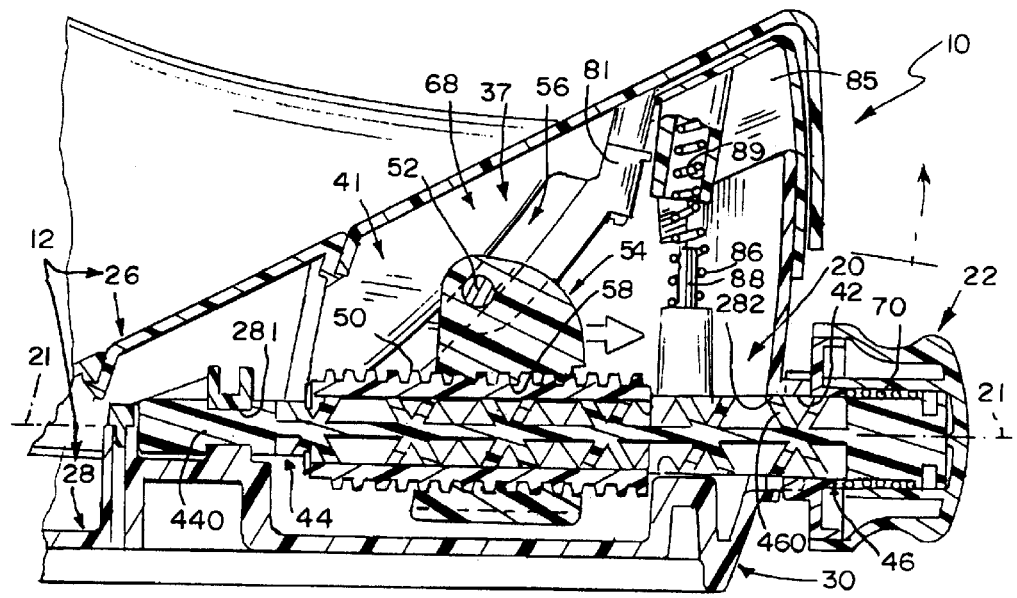
FIG. 10 is an enlarged sectional view taken along line 10-10 of FIG. 5 (with the infant carrier omitted) showing the tiltable carrier cradle in the low-tilt first tilted position.
Figure 11:
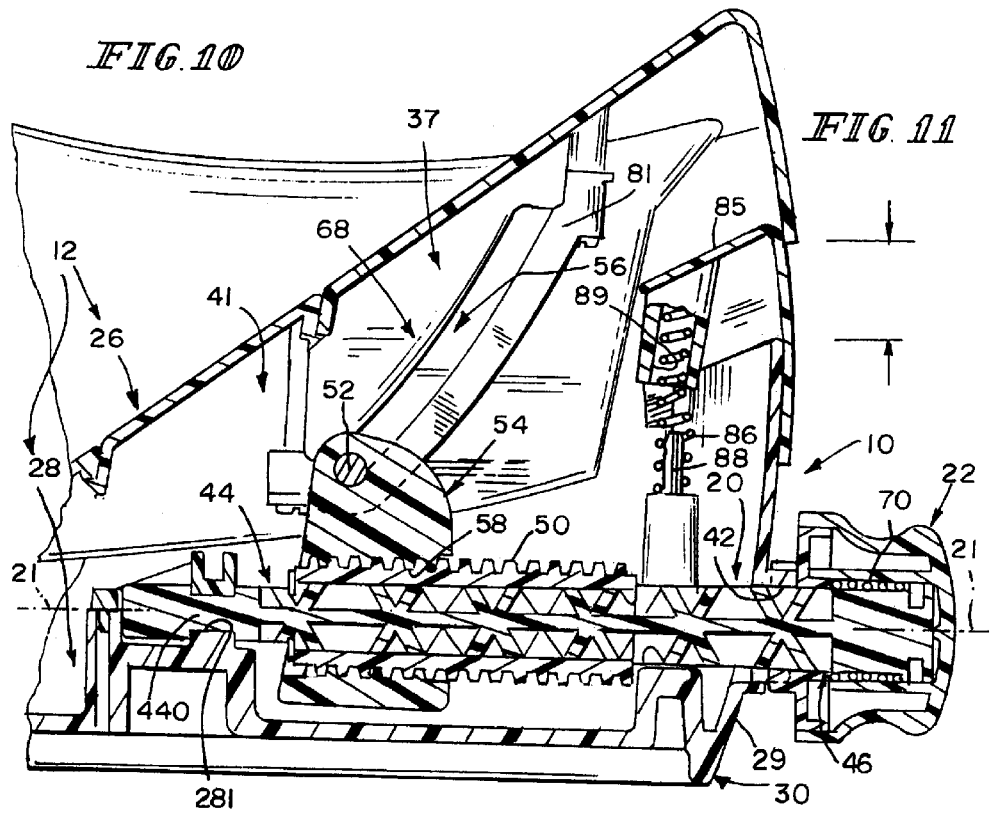
FIG. 11 is an enlarged sectional view taken along line 11-11 of FIG. 6 (with the infant carrier omitted) showing the tiltable carrier cradle in the high-tilt second tilted position.

Rotatable actuator 20 of cradle-orientation changer 36 includes an interior section 44 located in interior region 40 of cradle support 28 and engaged to cradle elevator 37 as suggested in FIGS. 7, 10, and 11. Rotatable actuator 20 also includes an exterior section 46 coupled to interior section 44 and arranged to extend through actuator-receiver aperture 42 and provide a terminal end 48 lying outside interior region 40 formed in cradle support 28 as suggested in FIGS. 7 and 8. Actuator-driver knob 22 is coupled to terminal end 48 of exterior section 46 of rotatable actuator 20 as suggested in FIGS. 2 and 7.

Figure 4:
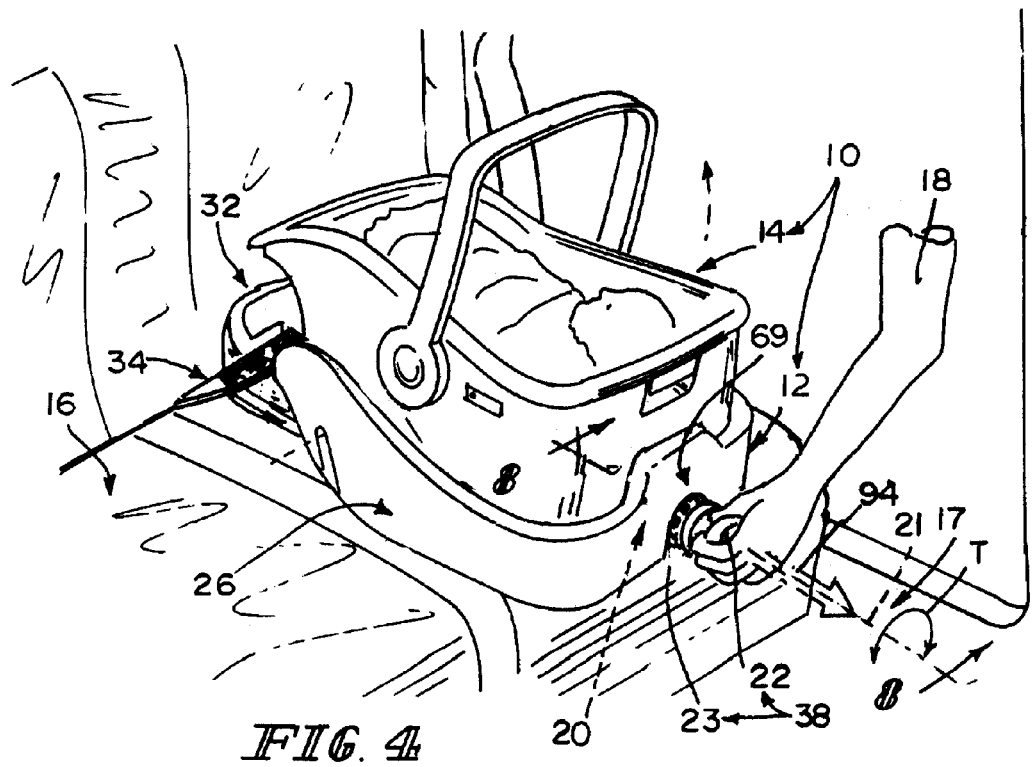
FIG. 4 is a perspective view similar to FIG. 3 after the infant carrier has been mated with the tiltable carrier cradle and showing the caregiver gripping the actuator-driver knob and pulling it in an outward direction (e.g., to the right) to disable a cradle-pivot blocker system coupled to the actuator-driver knob so as to unlock the tiltable carrier cradle and free the tiltable carrier cradle to be pivoted upwardly about the pivot axis relative to the cradle support to assume a low-tilt (i.e., gently sloping) first tilted position shown in FIG. 5 or a high-tilt (i.e., steeply sloping) second tilted position shown in FIG. 6.

Interior section 44 of rotatable actuator 20 includes elevator-mover means (e.g., worm 50) for moving cradle elevator 37 relative to cradle support 28 to cause tiltable carrier cradle 26 to pivot about pivot axis 27 in response to rotation of rotatable actuator 20 about axis of rotation 21 caused by a torque (T) applied to exterior section 46 of rotatable actuator 20 using actuator-driver knob 22 as suggested in FIG. 4 so that the angular orientation of tiltable carrier cradle 26 relative to cradle support 28 is changed. Interior section 44 of rotatable actuator 20 further includes an inner journal 440 that turns in a first bearing 281 included in cradle support 28 during rotation of rotatable actuator 20 about axis of rotation 21. Exterior section 46 of rotatable actuator 20 includes an outer journal 460 that turns in a second bearing 28 included in cradle support 28 during rotation of rotatable actuator 20 about axis of rotation 21. The elevator-mover means is located between inner and outer journals 440, 460 and includes a worm 50 in illustrative embodiments as suggested in FIGS. 2, 7, 10, and 11.

Cradle elevator 37 of cradle-orientation changer 36 includes a cradle-mover rod 52 and a rod-mover block 54 as suggested in FIGS. 1, 2, and 7. Cradle-mover rod 52 is mounted for sliding movement in a cradle-pivot channel 56 formed in tiltable carrier cradle 26 between (1) a first position shown, for example, in FIGS. 1 and 7, wherein tiltable carrier cradle 26 is arranged to lie in an initial (horizontal) position relative to cradle support 28; (2) a second position shown, for example, in FIG. 10, wherein tiltable carrier cradle 26 is arranged to lie in a first (low-tilt) tilted position relative to cradle support 28; and (3) a third position shown, for example, in FIG. 11 wherein tiltable carrier cradle 26 is arranged to lie in a second (high-tilt) tilted position relative to cradle support 28.

Cradle elevator 37 further includes first and second rod-guide strips 81, 82 that are coupled to an underside of tiltable carrier cradle 26 using fasteners 83 to form two spaced-apart cradle-pivot channels 56 as suggested in FIGS. 1 and 2. Cradle-mover rod 52 is arranged to extend into each of cradle-pivot channels 56 and ride on or along first and second rod-guide strips 81, 82 during movement of cradle-mover rod 52 in cradle-pivot channels 56 between the first, second, and third positions as suggested in FIGS. 1, 7, 10, and 11.

Lift-assist means 84 is provided in space 41 as suggested in FIGS. 2, 7, 10, and 11 for pivoting tiltable carrier cradle 26 in direction 85 about pivot axis 27 away from the underlying cradle support 28 during movement of cradle-mover rod 52 in cradle-pivot channels 56 from the first position shown in FIGS. 1, 3, and 7 to the second position shown in FIG. 10 and then to the third position shown in FIG. 11. In an illustrative embodiment, lift-assist means 84 comprises a bracket 85 coupled to tiltable carrier cradle 26 and first and second springs 86, 87. Each spring 86, 87 is a coiled compression spring coupled to a spring-mount post 88 included in carrier support 28 and a spring-receiver channel 89 formed in bracket 85 as suggested in FIGS. 2, 7, 10, and 11.

Rod-mover block 54 is coupled to cradle-mover rod 52 and formed to include a worm gear 58 surrounding and mating with worm 50 included in rotatable actuator 20 to establish worm-drive means for moving rod-mover block 54 back and forth along axis of rotation 21 to cause cradle-mover rod 52 to move in cradle-pivot channel 56 between the first, second, and third positions in response to rotation of rotatable actuator 20 about axis of rotation 21 so that the angular orientation of tiltable carrier cradle 26 relative to cradle support 28 is changed as suggested in FIGS. 4, 7, 10, and 11. The lift-assist means 84 operates to assist in raising a front end of tiltable carrier cradle 26 during movement of cradle-mover rod 52 from the first position to the third position as suggested in FIGS. 7, 10, and 11.

Worm gear 58 included in rod-mover block 54 is formed to include a central passageway 60 as shown, for example, in FIG. 2. Worm 50 is arranged to extend through central passageway 60 and mate with the surrounding worm gear 58 as suggested in FIGS. 2, 7, 10, and 11. Rod-mover block 54 is arranged to move relative to worm 50 back and forth along axis of rotation 21 during rotation of worm 50 in central passageway 60 about axis of rotation 21 as rotatable actuator 20 rotates about axis of rotation 21 as shown, for example, in FIGS. 7, 10, and 11.

Tilt controller 24 includes actuator-driver knob 22 and cradle-pivot blocker system 23 as suggested in FIG. 1. Actuator-driver knob 22 is configured to provide means for rotating rotatable actuator 20 about axis of rotation 21 as suggested in FIG. 4. Cradle-pivot blocker system 23 includes a series of lock teeth 62 coupled to actuator-driver knob 22 and a series of tooth blockers 64 coupled to cradle support 28 as suggested in FIG. 9. Each pair of adjacent tooth blockers 64 cooperate to form therebetween a tooth receiver 66 sized to receive a lock tooth 62 therein.

Actuator-driver knob 22 is mounted for sliding movement back and forth along exterior section 46 of rotatable actuator 20 between an inner position (shown in FIGS. 3 and 7) in close proximity to cradle support 28 to locate a lock tooth 62 in a companion tooth receiver 66 to block rotation of actuator-driver knob 22 about axis of rotation 21 and an outer position (shown in FIGS. 4 and 8) away from cradle support 28 to withdraw lock tooth 62 from its companion lock receiver 66 (and others of lock teeth 62 from their companion lock receivers 66) to free actuator-driver knob 22 to rotate about axis of rotation 21.

Cradle-pivot blocker system 23 further includes a spring 70 coupled to each of rotatable actuator 20 and actuator-driver knob 22 as suggested in FIGS. 2, 7, 10, and 11. Spring 70 is arranged to yieldably urge actuator-driver knob 22 along exterior section 46 of rotatable actuator 20 normally to assume the inner position to block rotation of actuator-driver knob 22 about axis of rotation 21 as suggested in FIGS. 7, 10, and 11. In illustrative embodiments, spring 70 is arranged to lie outside cradle support 28 and inside actuator-driver knob 22 as suggested in FIG. 8. Spring 70 is made of a coil of spring material as suggested in FIG. 2.

Cradle elevator 37 includes a worm gear 58 and a linkage 68 coupled to worm gear 58 and to tiltable carrier cradle 26. Linkage 68 is configured to move tiltable carrier cradle 26 about pivot axis 27 relative to cradle support 28 in response to movement of worm gear 58 relative to rotatable actuator 20 as shown for example in FIGS. 7, 10, and 11. Rotatable actuator 20 includes a worm 50 mated to worm gear 58 and configured to rotate about axis of rotation 21 in response to rotation of rotatable actuator 20 about axis of rotation 21 by caregiver 18.

Changer regulator 38 is associated with rotatable actuator 20 and cradle support 28. Changer regulator 38 includes an actuator-driver knob 22 coupled to rotatable actuator 20 and a releasable actuator lock 69 coupled to actuator-driver knob 22 and to cradle support 28 as suggested in FIG. 9. In an illustrative embodiment, releasable actuator lock 69 comprises lock teeth 62, tooth blockers 64, and tooth receivers 66. Lock teeth 62 are arranged to lie in an annular pattern to mesh with tooth receivers 66 that are also arranged to lie in an annular pattern owing to the arrangement of tooth blockers 64 in an annular pattern as shown, for example, in FIG. 9. Releasable actuator lock 69 is configured to block rotation of rotatable actuator 20 about axis of rotation 21 at the option of a caregiver 18 to establish a selected angular orientation of tiltable carrier cradle 26 relative to cradle support 28 as suggested in FIGS. 4-6.

Infant carrier 14 can be mounted on an adjustable base 12 that is tethered to a tether anchor 35 included in a vehicle 17 to hold adjustable base 12 in a tethered position 14 on a vehicle seat 16 included in vehicle 17 as suggested in FIGS. 1, 3, and 4. A caregiver 18 is shown passing an infant carrier 14 through an opening 15 into a vehicle passenger compartment 19 formed in vehicle 17 in FIG. 3. Tiltable carrier cradle 26 is retained in an untilted (nearly horizontal) position relative to the underlying cradle support 28 and provided with two separate carrier-anchor rods 91, 92 (see FIG. 3) that are adapted to mate with rod mounts 90 included in infant carrier 14 gripped by caregiver 18.

Figure 5:
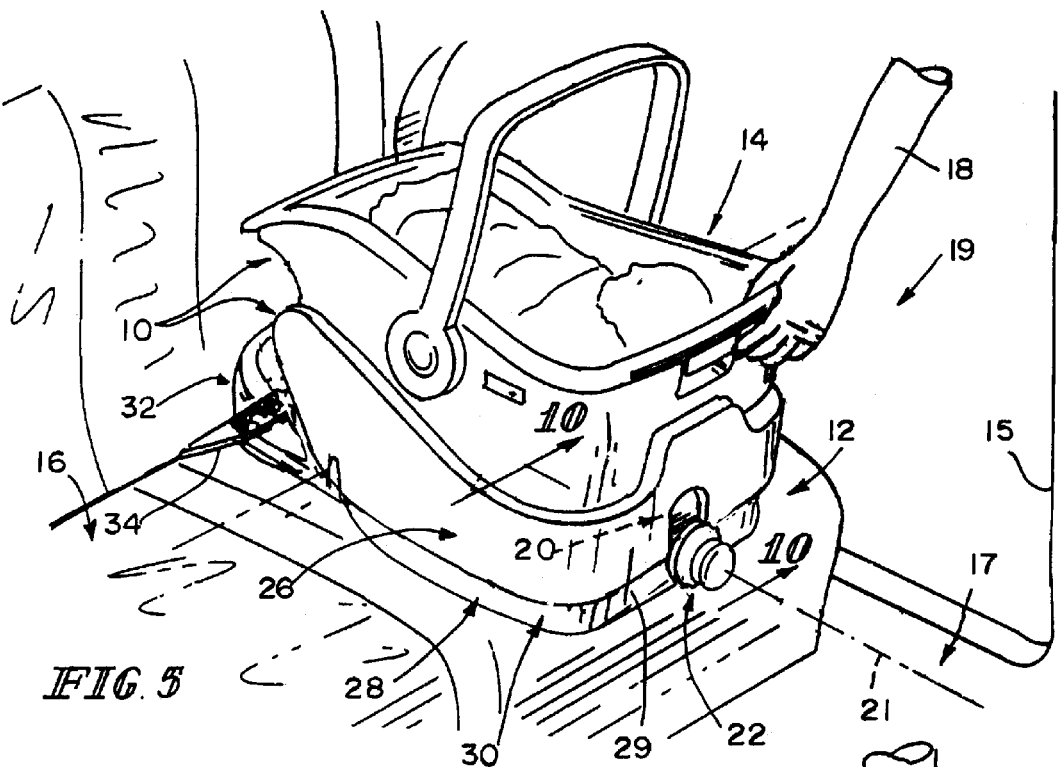
FIG. 5 is a perspective view similar to FIGS. 3 and 4 showing the tiltable carrier cradle after it has been pivoted relative to the tethered cradle support to assume the low-tilt first tilted position so as to raise the head of an infant at rest in the infant carrier mated with the underlying tiltable carrier cradle.
Figure 6:
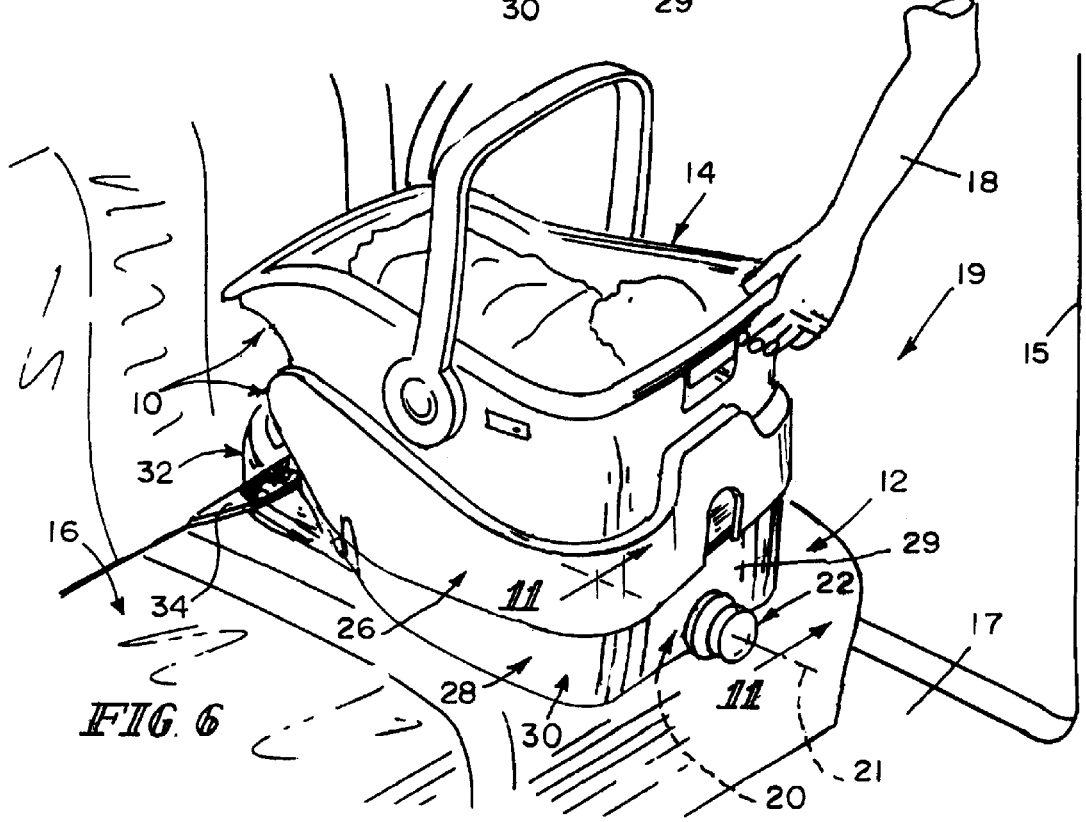
FIG. 6 is a perspective view similar to FIGS. 3-5 showing the tiltable cradle after it has been pivoted further relative to the tethered cradle support to assume the high-tilt second tilted position so as to raise further the head of an infant at rest in the infant carrier.

Infant carrier 14 has been mated with tiltable carrier cradle 26 as suggested in FIG. 4. Caregiver 18 grips actuator-driver knob 22 and pulls it in an outward direction 94 as suggested in FIG. 4 to disable cradle-pivot blocker system 23 coupled to driver-actuator knob 22 so as to unlock tiltable carrier cradle 26 and free tiltable carrier cradle 26 to be pivoted upwardly about pivot axis 27 relative to cradle support 28 to assume a low-tilt (i.e., gently sloping) first tilted position shown in FIG. 5 or a high-tilt (i.e., steeply sloping) second tilted position shown in FIG. 6. Tiltable carrier cradle 26 is shown in FIG. 5 after it has been pivoted relative to the tethered cradle support 28 to assume the low-tilt first tilted position so as to raise the head of an infant at rest in infant carrier 14 mated with the underlying tiltable carrier cradle 26. Tiltable carrier cradle 26 is shown in FIG. 6 after it has been pivoted further relative to the tethered cradle support 28 to assume the high-tilt second tilted position so as to raise further the head of an infant at rest in infant carrier 14.

As suggested in FIG. 7, tiltable carrier cradle 26 is moved by caregiver 18 to assume a no-tilt (i.e., nearly horizontal) initial position relative to the underlying cradle support 28. Cradle pivot-blocker system 23 included in adjustable base 12 is enabled to use releasable actuator lock 69 to block pivoting movement of tiltable carrier cradle 26 relative to the underlying cradle support 28.

Figure 8:
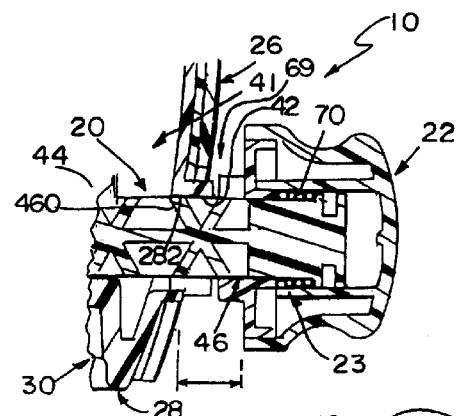
FIG. 8 is an enlarged sectional view of a portion of the adjustable base taken along line 8-8 of FIG. 4 (with the infant carrier omitted) showing that the caregiver has pulled the actuator-driver knob outwardly away from the neighboring cradle support to disable the cradle pivot-blocker system so as to unlock the tiltable carrier cradle and free the tiltable carrier cradle to pivot about the pivot axis relative to the underlying cradle support.

As suggested in FIG. 8, caregiver 18 has pulled actuator-driver knob 22 outwardly away from neighboring cradle support 28 to disable cradle pivot-blocker system 23. This action unlocks tiltable carrier cradle 26 and frees tiltable carrier cradle 26 to pivot about pivot axis 27 relative to the underlying cradle support 28.

Figure 9:
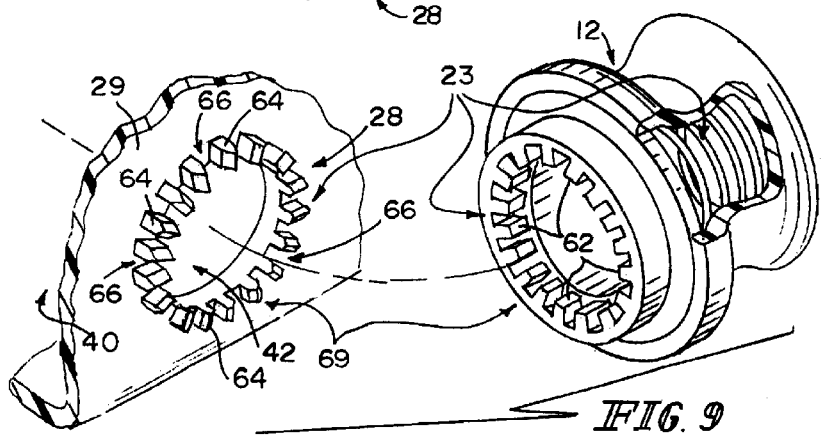
FIG. 9 is an exploded perspective assembly view of the components that cooperate to form the changer regulator and showing that the cradle-pivot blocker system includes a set of lock teeth coupled to the actuator-driver knob and a companion set of lugs coupled to the cradle support and arranged to lie in a circle and form a series of teeth receivers sized to receive the lock teeth therein to block rotation of the actuator-driver knob about its axis of rotation.

As suggested in FIG. 9, cradle-pivot blocker system 23 includes a set of lock teeth 62 coupled to actuator-driver knob 22 and a companion set of tooth blockers 64 coupled to cradle support 28 and arranged to lie in a circle and cooperate to form a series of teeth receivers 66 sized to receive lock teeth 62 therein to block rotation of actuator-driver knob 22 about its axis of rotation 21. Tiltable carrier cradle 26 is shown in the low-tilt first tilted position in FIG. 10. Tiltable carrier cradle 26 is shown in the high-tilt second tilted position in FIG. 11.

The invention claimed is:

1. A child restraint comprising
an adjustable base including a cradle support adapted to set on a passenger seat in a vehicle, a tiltable carrier cradle mounted on the cradle support for pivotable movement about a pivot axis relative to the cradle support to change angular orientation of the tiltable carrier cradle relative to the cradle support, and a tilt controller coupled to the tiltable carrier cradle and to the cradle support,
a detachable infant carrier configured to mate temporarily with the tiltable carrier cradle and move therewith relative to the cradle support during pivotable movement of the tiltable carrier cradle about the pivot axis, wherein the tilt controller includes a cradle-orientation changer comprising a rotatable actuator mounted on the cradle support for rotation about an axis of rotation and a cradle elevator coupled to the tiltable carrier cradle and to the rotatable actuator and configured to pivot the tiltable carrier cradle about the pivot axis in response to rotation of the rotatable actuator about the axis of rotation,
wherein the cradle support is formed to include an interior region and an actuator-receiver aperture opening into the interior region and the rotatable actuator includes an interior section located in the interior region of the cradle support and engaged to the cradle elevator and an exterior section coupled to the interior section and arranged to extend through the actuator-receiver aperture and provide a terminal end lying outside the interior region,
wherein the interior section of the rotatable actuator includes elevator-mover means for moving the cradle elevator relative to the cradle support to cause the tiltable carrier cradle to pivot about the pivot axis in response to rotation of the rotatable actuator about the axis of rotation caused by a torque applied to the exterior section of the rotatable actuator so that the angular orientation of the tiltable carrier cradle relative to the cradle support is changed, and
wherein the elevator-mover means is a worm, the cradle elevator includes a cradle-mover rod mounted for sliding movement in a cradle-pivot channel formed in the tiltable carrier cradle between a first position wherein the tiltable carrier cradle is arranged to lie in an initial position relative to cradle support and a second position wherein the tiltable carrier cradle is arranged to lie in a first tilted position relative to the cradle support, and the cradle elevator further includes a rod-mover block coupled to the cradle-mover rod and formed to include a worm gear mating with the worm to establish worm-drive means for moving the rod-mover block along the axis of rotation to cause the cradle-mover rod to move in the cradle-pivot channel between the first and second positions in response to rotation of the rotatable actuator about the axis of rotation so that the angular orientation of the tiltable carrier cradle relative to the cradle support is changed.

2. The child restraint of claim 1, wherein the interior section of the rotatable actuator further includes an inner journal that turns in a first bearing included in the cradle support during rotation of the rotatable actuator about the axis of rotation, the exterior section of the rotatable actuator includes an outer journal that turns in a second bearing included in the cradle support during rotation of the rotatable actuator about the axis of rotation, and the elevator-mover means is located between the inner and outer journals.

3. The child restraint of claim 1, wherein the worm gear is formed to include a central passageway, the worm is arranged to extend through the central passageway, and the rod-mover block is arranged to move relative to the worm along the axis of rotation during rotation of the worm in the central passageway about the axis of rotation.

4. A child restraint comprising
an adjustable base including a cradle support adapted to set on a passenger seat in a vehicle, a tiltable carrier cradle mounted on the cradle support for pivotable movement about a pivot axis relative to the cradle support to change angular orientation of the tiltable carrier cradle relative to the cradle support, and a tilt controller coupled to the tiltable carrier cradle and to the cradle support,
a detachable infant carrier configured to mate temporarily with the tiltable carrier cradle and move therewith relative to the cradle support during pivotable movement of the tiltable carrier cradle about the pivot axis, wherein the tilt controller includes a cradle-orientation changer comprising a rotatable actuator mounted on the cradle support for rotation about an axis of rotation and a cradle elevator coupled to the tiltable carrier cradle and to the rotatable actuator and configured to pivot the tiltable carrier cradle about the pivot axis in response to rotation of the rotatable actuator about the axis of rotation,
wherein the cradle support is formed to include an interior region and an actuator-receiver aperture opening into the interior region and the rotatable actuator includes an interior section located in the interior region of the cradle support and engaged to the cradle elevator and an exterior section coupled to the interior section and arranged to extend through the actuator-receiver aperture and provide a terminal end lying outside the interior region,
wherein the interior section of the rotatable actuator includes elevator-mover means for moving the cradle elevator relative to the cradle support to cause the tiltable carrier cradle to pivot about the pivot axis in response to rotation of the rotatable actuator about the axis of rotation caused by a torque applied to the exterior section of the rotatable actuator so that the angular orientation of the tiltable carrier cradle relative to the cradle support is changed, and
wherein the tilt controller includes an actuator-driver knob configured to provide means for rotating the rotatable actuator about the axis of rotation in response to rotation of the actuator-driver knob about the axis of rotation, the tilt controller further includes a cradle-pivot blocker system including a lock tooth coupled to the actuator-driver knob and a pair of tooth blockers coupled to the cradle support and arranged to define a tooth receiver therebetween sized to receive the lock tooth therein, and the actuator-driver knob is mounted for sliding movement along the exterior section of the rotatable actuator between an inner position in close proximity to the cradle support to locate the lock tooth in the tooth receiver to confront the pair of tooth blockers to block rotation of the actuator-driver knob about the axis of rotation and an outer position away from the cradle support to withdraw the lock tooth from the lock receiver to free the actuator-driver knob to rotate about the axis of rotation.

5. The child restraint of claim 4, wherein the cradle-pivot blocker system further includes a spring coupled to each of the rotatable actuator and the actuator-driver knob and arranged to yieldably urge the actuator-driver knob along the exterior section of the rotatable actuator normally to assume the inner position to block rotation of the actuator-driver knob about the axis of rotation.

6. The child restraint of claim 5, wherein the spring is arranged to lie outside the cradle support and inside the actuator-driver knob.

7. A child restraint comprising an adjustable base including a cradle support adapted to set on a passenger seat in a vehicle, a tiltable carrier cradle mounted on the cradle support for pivotable movement about a pivot axis relative to the cradle support to change angular orientation of the tiltable carrier cradle relative to the cradle support, and a tilt controller coupled to the tiltable carrier cradle and to the cradle support, a detachable infant carrier configured to mate temporarily with the tiltable carrier cradle and move therewith relative to the cradle support during pivotable movement of the tiltable carrier cradle about the pivot axis, wherein the tilt controller includes a cradle-orientation changer comprising a rotatable actuator mounted on the cradle support for rotation about an axis of rotation and a cradle elevator coupled to the tiltable carrier cradle and to the rotatable actuator and configured to pivot the tiltable carrier cradle about the pivot axis in response to rotation of the rotatable actuator about the axis of rotation, wherein the rotatable actuator includes elevator-mover means for moving the cradle elevator relative to the cradle support to cause the tiltable carrier cradle to pivot about the pivot axis in response to rotation of the rotatable actuator about the axis of rotation caused by a torque applied to the exterior section of the rotatable actuator so that the angular orientation of the tiltable carrier cradle relative to the cradle support is changed, and wherein the elevator-mover means is a worm, the cradle elevator includes a cradle-mover rod mounted for sliding movement in a cradle-pivot channel formed in the tiltable carrier cradle between a first position wherein the tiltable carrier cradle is arranged to lie in an initial position relative to cradle support and a second position wherein the tiltable carrier cradle is arranged to lie in a first tilted position relative to the cradle support, and the cradle elevator further includes a rod-mover block coupled to the cradle-mover rod and formed to include a worm gear mating with the worm to establish worm-drive means for moving the rod-mover block along the axis of rotation to cause the cradle-mover rod to move in the cradle-pivot channel between the first and second positions in response to rotation of the rotatable actuator about the axis of rotation so that the angular orientation of the tiltable carrier cradle relative to the cradle support is changed.

8. A child restraint comprising an adjustable base including a cradle support adapted to set on a passenger seat in a vehicle, a tiltable carrier cradle mounted on the cradle support for pivotable movement about a pivot axis relative to the cradle support to change angular orientation of the tiltable carrier cradle relative to the cradle support, and a tilt controller coupled to the tiltable carrier cradle and to the cradle support, a detachable infant carrier configured to mate temporarily with the tiltable carrier cradle and move therewith relative to the cradle support during pivotable movement of the tiltable carrier cradle about the pivot axis, wherein the tilt controller includes a cradle-orientation changer comprising a rotatable actuator mounted on the cradle support for rotation about an axis of rotation and a cradle elevator coupled to the tiltable carrier cradle and to the rotatable actuator and configured to pivot the tiltable carrier cradle about the pivot axis in response to rotation of the rotatable actuator about the axis of rotation, wherein the cradle elevator includes a worm gear and a linkage coupled to the worm gear and to the tiltable carrier cradle and configured to move the tiltable carrier cradle about the pivot axis relative to the cradle support in response to movement of the worm, gear relative to the rotatable actuator and the rotatable actuator includes a worm mated to the worm gear and configured to rotate about the axis of rotation in response to rotation of rotatable actuator about the axis of rotation, and wherein the tilt controller further includes a changer regulator associated with the rotatable actuator and the cradle support and the changer regulator includes an actuator-driver knob coupled to the rotatable actuator and a releasable actuator lock coupled to the actuator-driver knob and to the cradle support and configured to block rotation of the rotatable actuator about the axis of rotation at the option of a caregiver to establish a selected angular orientation of the tiltable carrier cradle relative to the cradle support.

9. A child restraint comprising an adjustable base including a cradle support adapted to set on a passenger seat in a vehicle, a tiltable carrier, cradle mounted on the cradle support for pivotable movement about a pivot axis relative to the cradle support to change angular orientation of the tiltable carrier cradle relative to the cradle support, and a tilt controller coupled to the tiltable carrier cradle and to the cradle support, a detachable infant carrier configured to mate temporarily with the tiltable carrier cradle and move therewith relative to the cradle support during pivotable movement of the tiltable carrier cradle about the pivot axis, wherein the tilt controller includes a cradle-orientation changer comprising a rotatable actuator mounted on the cradle support for rotation about an axis of rotation and a cradle elevator coupled to the tiltable carrier cradle and to the rotatable actuator and configured to pivot the tiltable carrier cradle about the pivot axis in response to rotation of the rotatable actuator about the axis of rotation, and wherein the tilt controller further includes a changer regulator associated with the rotatable actuator and the cradle support and the changer regulator includes an actuator-driver knob coupled to the rotatable actuator and a releasable actuator lock coupled to the actuator-driver knob and to the cradle support and configured to block rotation of the rotatable actuator about the axis of rotation at the option of a caregiver to establish a selected angular orientation of the tiltable carrier cradle relative to the cradle support.

10. The child restraint of claim 9, wherein the changer regulator further includes a spring coupled to each of the rotatable actuator and the actuator-driver knob and arranged to yieldably urge the actuator-driver knob along the exterior section of the rotatable actuator normally to assume the inner position to block rotation of the actuator-driver knob about the axis of rotation.

11. A child restraint comprising
a cradle support adapted to set on a passenger seat in a vehicle,
a tiltable carrier cradle mounted for angular movement relative to the cradle support,
a worm included in a rotatable actuator supported for rotation about an axis of rotation on the cradle support,
a cradle elevator including a worm gear mated to the worm and configured to move along the axis of rotation in response to rotation of the worm about the axis of rotation and a linkage coupled to the worm gear and to the tiltable carrier cradle and configured to move the tiltable carrier cradle angularly relative to the cradle support to establish an angular orientation of the tiltable carrier cradle in response to movement of the worm gear along the axis of rotation, and
wherein the linkage includes a cradle-mover rod mounted for sliding movement in a cradle-pivot channel formed in the tiltable carrier cradle between a first position wherein the tiltable carrier cradle is arranged to lie in an initial position relative to cradle support and a second position wherein the tiltable carrier cradle is arranged to lie in a first tilted position relative to the cradle support, and the linkage further includes a rod-mover block coupled to the cradle-mover rod and formed to include the worm gear, the worm is mated to the worm gear to establish worm-drive means for moving the rod-mover block along the axis of rotation to cause the cradle-mover rod to move in the cradle-pivot channel between the first and second positions in response to rotation of the rotatable actuator about the axis of rotation so that the angular orientation of the tiltable carrier cradle relative to the cradle support is changed.

12. The child restraint of claim 11, wherein the rotatable actuator further includes an inner journal that turns in a first bearing included in the cradle support during rotation of the rotatable actuator about the axis of rotation, and an outer journal that turns in a second bearing included in the cradle support during rotation of the rotatable actuator about the axis of rotation and the worm is located between the inner and outer journals.

13. The child restraint of claim 11, wherein the worm gear is formed to include a central passageway, the worm is arranged to extend through the central passageway, and the rod-mover block is arranged to move relative to the worm along the axis of rotation during rotation of the worm in the central passageway about the axis of rotation.

14. A child restraint comprising
a cradle support adapted to set on a passenger seat in a vehicle,
a tiltable carrier cradle mounted for angular movement relative to the cradle support,
a worm included in a rotatable actuator supported for rotation about an axis of rotation on the cradle support,
a cradle elevator including a worm gear mated to the worm and configured to move along the axis of rotation in response to rotation of the worm about the axis of rotation and a linkage coupled to the worm gear and to the tiltable carrier cradle and configured to move the tiltable carrier cradle angularly relative to the cradle support to establish an angular orientation of the tiltable carrier cradle in response to movement of the worm gear along the axis of rotation, and
wherein the tilt controller further includes a changer regulator associated with the rotatable actuator and the cradle support and the changer regulator includes an actuator-driver knob coupled to the rotatable actuator and a releasable actuator lock coupled to the actuator-driver knob and to the cradle support and configured to block rotation of the rotatable actuator about the axis of rotation at the option of a caregiver to establish a selected angular orientation of the tiltable carrier cradle relative to the cradle support.

* * * * *